United States Patent
Bates et al.

(10) Patent No.: US 10,353,410 B2
(45) Date of Patent: Jul. 16, 2019

(54) GEOGRAPHIC SPECIFIC CONTROLLING OF A TRANSPORT REFRIGERATION SYSTEM

(71) Applicant: THERMO KING CORPORATION, Minneapolis, MN (US)

(72) Inventors: Scott Robert Bates, Minneapolis, MN (US); Robert Michael Lattin, Minneapolis, MN (US); Erich Albert Lucht, Arden Hills, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 94 days.

(21) Appl. No.: 14/652,979

(22) PCT Filed: Dec. 27, 2013

(86) PCT No.: PCT/US2013/078008
§ 371 (c)(1),
(2) Date: Jun. 17, 2015

(87) PCT Pub. No.: WO2014/106060
PCT Pub. Date: Jul. 3, 2014

(65) Prior Publication Data
US 2015/0338858 A1   Nov. 26, 2015

Related U.S. Application Data

(60) Provisional application No. 61/746,225, filed on Dec. 27, 2012.

(51) Int. Cl.
*G05D 23/00*   (2006.01)
*B60P 3/20*   (2006.01)
(Continued)

(52) U.S. Cl.
CPC .......... *G05D 23/00* (2013.01); *B60H 1/00771* (2013.01); *B60H 1/3232* (2013.01); *B60P 3/20* (2013.01)

(58) Field of Classification Search
CPC ..... B60H 1/00771; B60H 1/3232; B60P 3/20; G05D 23/00
See application file for complete search history.

(56) References Cited

U.S. PATENT DOCUMENTS 4,085,355 A * 4/1978 Fradella ............. H02P 23/06
                                                318/703
4,706,468 A * 11/1987 Howland ........... B60H 1/3232
                                                62/199

(Continued)

FOREIGN PATENT DOCUMENTS

| EP | 1790921 A1 | 5/2007 |
| JP | 2003279217 | 10/2003 |
| WO | 2011005459 A2 | 1/2011 |

OTHER PUBLICATIONS

International search report for International application No. PCT/US2013/078008 dated Apr. 18, 2014 (4 pages).

(Continued)

*Primary Examiner* — Jason Lin
(74) *Attorney, Agent, or Firm* — Hamre, Schumann, Mueller & Larson, P.C.

(57) ABSTRACT

Systems and methods for automatically adjust control parameters of a TRS according to local, regional and/or federal regulations on emissions, noise and/or other requirements applicable to a particular location and/or time, are provided. When the TRS is operating within a predefined geographic region at a specific time, control parameters or an operation mode of the TRS can be automatically adjusted (Continued)

so that emission and/or noise from the TRS can be compliant with the regulations applicable to that predefined geographic region.

20 Claims, 4 Drawing Sheets

(51) Int. Cl.
  *B60H 1/00* (2006.01)
  *B60H 1/32* (2006.01)

(56) References Cited

U.S. PATENT DOCUMENTS

| | | | |
|---|---|---|---|
| 5,880,958 A | 3/1999 | Helms et al. | |
| 6,067,805 A | 5/2000 | Porter et al. | |
| 6,112,151 A * | 8/2000 | Kruse | F02D 41/2422 |
| | | | 180/167 |
| 6,272,457 B1 * | 8/2001 | Ford | G01C 21/3629 |
| | | | 342/357.31 |
| 6,321,549 B1 * | 11/2001 | Reason | B60H 1/00885 |
| | | | 62/223 |
| 6,687,609 B2 | 2/2004 | Hsiao et al. | |
| 6,886,357 B2 | 5/2005 | Gano, III et al. | |
| 7,783,507 B2 | 8/2010 | Schick et al. | |
| 8,295,950 B1 | 10/2012 | Wordsworth et al. | |
| 2002/0059075 A1 | 5/2002 | Schick et al. | |
| 2002/0099496 A1 | 7/2002 | Weisman, II et al. | |
| 2005/0192724 A1 * | 9/2005 | Hendry | B60H 1/00735 |
| | | | 701/36 |
| 2006/0041370 A1 * | 2/2006 | Gault | F02D 41/2422 |
| | | | 701/115 |
| 2007/0008119 A1 | 1/2007 | Pohle et al. | |
| 2007/0084444 A1 | 4/2007 | Bellistri et al. | |
| 2007/0193254 A1 * | 8/2007 | Johannes | F01N 3/0871 |
| | | | 60/286 |
| 2008/0107849 A1 | 5/2008 | Gano | |
| 2008/0196388 A1 * | 8/2008 | Johnson | F02D 13/04 |
| | | | 60/274 |
| 2008/0245341 A1 * | 10/2008 | Gallagher | B61L 3/006 |
| | | | 123/488 |
| 2010/0274604 A1 * | 10/2010 | Crilly | G06Q 10/08 |
| | | | 705/333 |
| 2012/0000212 A1 * | 1/2012 | Sanders | F25D 29/003 |
| | | | 62/62 |
| 2012/0111044 A1 | 5/2012 | Chen et al. | |
| 2012/0216509 A1 * | 8/2012 | Sujan | F02D 41/021 |
| | | | 60/274 |
| 2012/0252488 A1 | 10/2012 | Hartmann et al. | |
| 2014/0026599 A1 * | 1/2014 | Rusignuolo | F25B 49/025 |
| | | | 62/56 |
| 2014/0180559 A1 * | 6/2014 | Light-Holets | F02D 41/0025 |
| | | | 701/102 |
| 2014/0331706 A1 * | 11/2014 | Taras | F25B 27/00 |
| | | | 62/243 |

OTHER PUBLICATIONS

Written opinion for International application No. PCT/US2013/078008, dated Apr. 18, 2014 (5 pages).

Supplementary European Search Report issued in corresponding European Application No. 13869065.6 dated Jan. 30, 2017 (3 pages).

* cited by examiner

GEOGRAPHIC SPECIFIC CONTROLLING OF A TRANSPORT REFRIGERATION SYSTEM

FIELD OF TECHNOLOGY

The embodiments disclosed herein relate generally to a transport refrigeration system (TRS). More specifically, the embodiments described herein relate to methods and systems for automatically adjusting control parameters of the TRS.

BACKGROUND

A transport refrigeration system (TRS) is generally used to control an environmental condition (e.g., temperature, humidity, air quality, and the like) within a refrigerated transport unit (e.g., a container on a flat car, an intermodal container, etc.), a truck, a box car, or other similar transport unit (generally referred to as a "refrigerated transport unit"). Refrigerated transport units are commonly used to transport perishable items such as produce, frozen foods, and meat products. Typically, a transport refrigeration unit (TRU) is attached to the refrigerated transport unit to control the environmental condition of the cargo space. The TRU can include, without limitation, a compressor, a condenser, an expansion valve, an evaporator, and fans or blowers to control the heat exchange between the air inside the cargo space and the ambient air outside of the refrigerated transport unit.

SUMMARY

The embodiments described herein relate to methods and systems for automatically adjusting control parameters of a TRS. In particular, systems and methods described herein can automatically adjust control parameters of the TRS according to local, regional and/or federal regulations on emissions, noise and/or other requirements applicable to a particular location and/or time. This can achieve regulation compliance while also achieving optimal climate control performance for the TRS.

In some embodiments, location and/or time information of a TRS can be determined by a positioning device such as, for example, a positioning device based on a Global Positioning System (GPS). When the TRS is operating within a predefined geographic region at a specific time, control parameters of the TRS can be automatically adjusted to be compliant with regulations on emission and/or noise applicable to that predefined geographic region. The geographic region(s) can be predefined based on, e.g., various noise or emission regulations or customer desire.

In one embodiment, a method for automatically adjust control parameters of a TRS, is provided. The method includes obtaining location and time information of the TRS, determining appropriate geographic data, determining a set of control parameters correlated to the geographic data, and running the TRS with the set of control parameters.

In one embodiment, a transport refrigeration system (TRS) includes a transport refrigeration unit (TRU) including a control unit, a TRS genset configured to provide power to the TRU, and a positioning device for sending location and time information to the control unit. The control unit determines appropriate geographic data based on the location and time information, and determines a set of control parameters correlated to the appropriate geographic data.

BRIEF DESCRIPTION OF THE DRAWINGS

Referring now to the drawings in which like reference numbers represent corresponding parts throughout.

DETAILED DESCRIPTION

The embodiments described herein relate to methods and systems for automatically adjusting control parameters of a TRS. In particular, systems and methods described herein can automatically adjust control parameters of the TRS according to local, regional and/or federal regulations on emissions, noise and/or other requirements applicable to a particular location and/or time. This can achieve regulation compliance while also achieving optimal climate control performance for the TRS.

In some embodiments, a TRS can be off road, for example, in a yard or a distribution center. The location of the TRS and related time information can be determined by a positioning device such as, for example, a device based on the GPS. a positioning device based on a general packet radio service (GPRS), a cellphone in communication with a telecommunication tower, etc. In some embodiments, the location and time information of the TRS can be determined Geographic region(s) can be predefined based on various regulations on noise and/or emission or customer desire. When the TRS is operating within a predefined geographic region, control parameters or operation modes of the TRS can be automatically adjusted so that emission and/or noise from the TRS can be compliant with the regulations applicable to that predefined geographic region. This allows optimized operation of the TRS without breaking regulations. This also allows the TRS to perform multiple geographic specific control strategies independent of operator intervention.

References are made to the accompanying drawings that form a part hereof, and in which is shown by way of illustration of the embodiments in which the methods and systems described herein may be practiced. The term "refrigerated transport unit" generally refers to, for example, a conditioned trailer, container, railcars or other type of transport unit, etc. The term "transport refrigeration system" or "TRS" refers to a refrigeration system for controlling the refrigeration of an internal space of the refrigerated transport unit. The term "conditioned air" refers to air that has been treated so as to maintain a desired condition, for example, desired temperature or desired moisture control. The term "conditioned space" or "conditioned environment" refers to a space, a zone or an environment that receives the treated air.

It will be appreciated that the embodiments described herein may be used in any suitable temperature controlled apparatus such as a ship board container, a straight truck, an over the road truck cabin, a bus or train HVAC (Heating, Ventilation and Air-Conditioning system), an APU (auxiliary power unit) for providing heating and cooling to a cab of e.g. a transport vehicle, etc. The TRS may be a vapor-compressor type refrigeration system, or any other suitable refrigeration system that can use refrigerant, cold plate technology, etc.

Figure 1:
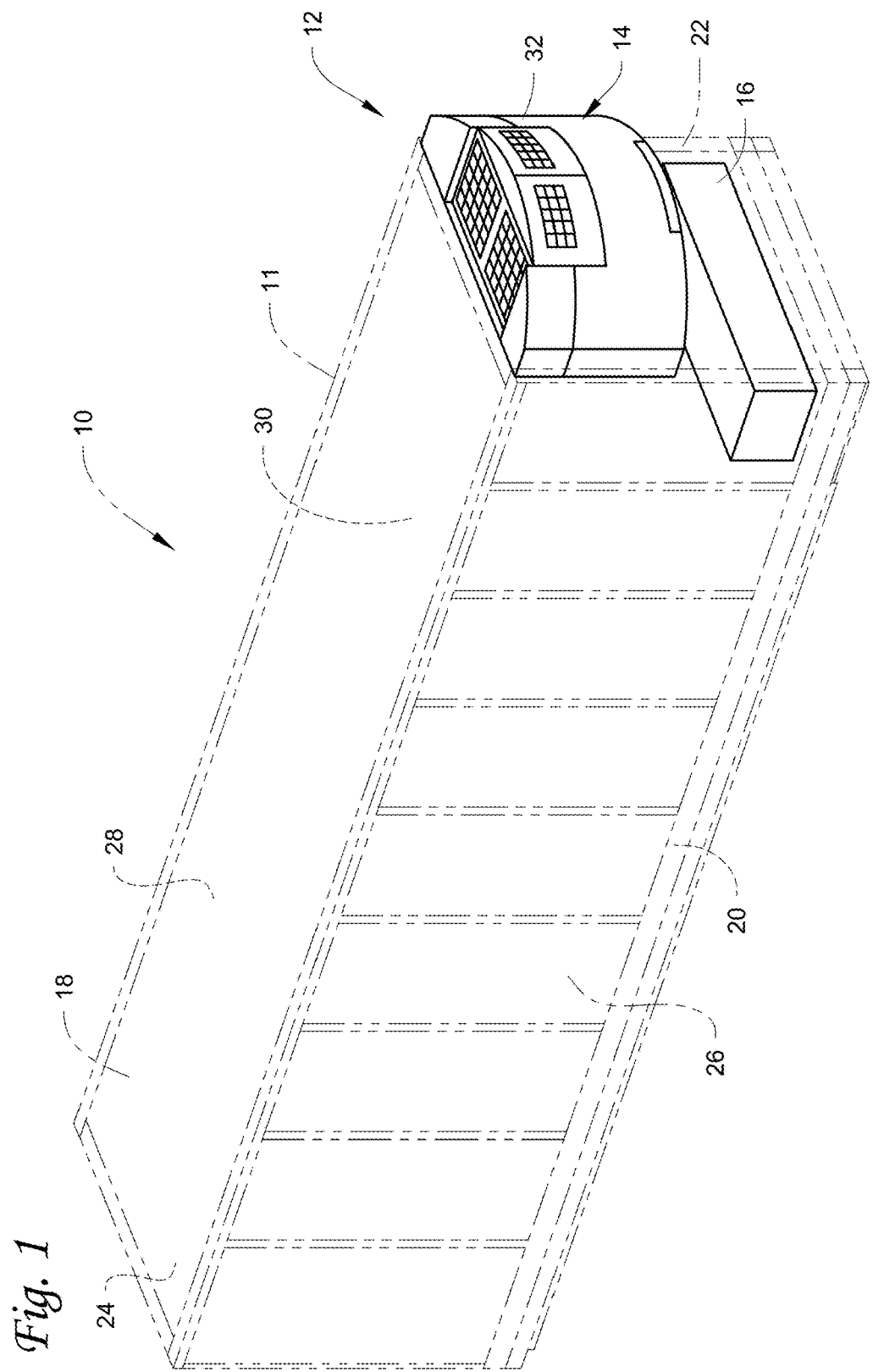
FIG. 1 illustrates a perspective view of a conditioned transport unit with a TRS, according to one embodiment.

FIG. 1 illustrates a perspective view of a refrigerated transport unit 10 that includes a transport unit 11 and a TRS 12 that includes a TRU 14 connected to a generator set (genset) 16. The transport unit 11 includes a roof 18, a floor 20, a front wall 22, a rear wall 24, and opposing side walls 26, 28. The TRU 14 is positioned on the front wall 22 of the transport unit 11. A conditioned cargo space 30 is defined by the roof 18, the floor 20, the front wall 22, the rear wall 24, and the opposing sidewalls 26, 28. The TRS 12 is configured to transfer heat between the conditioned cargo space 30 and the outside environment.

As shown in FIG. 1, the TRU 14 is enclosed in a housing 32. The TRU 14 is in communication with the conditioned cargo space 30 and controls the temperature in the conditioned cargo space 30. The TRU 14 includes a TRS controller (not shown) that regulates various operating conditions (e.g., temperature, humidity, etc.) of the conditioned cargo space 30 and is powered by the genset 16. The TRU 14 includes a closed refrigerant circuit (not shown) powered by the genset 16, which regulates various operating conditions (e.g., temperature, humidity, etc.) of the conditioned cargo space 30 based on instructions received from the TRS controller (not shown). The closed refrigerant circuit can include an Electronic Throttle Valve (ETV, not shown), a compressor (not shown) coupled to a condenser (not shown) and an evaporator (not shown) that cools the conditioned cargo space 30 and any perishable cargo contained therein.

The genset 16 generally includes an engine (not shown), a fuel container (not shown) and a generator (not shown). The engine may be an internal combustion engine (e.g., diesel engine, etc.) that may generally have a cooling system (e.g., water or liquid coolant system), an oil lubrication system, and an electrical system (none shown). An air filtration system (not shown) filters air directed into a combustion chamber (not shown) of the engine. In some embodiments the engine is not specifically configured for the TRS 12, but can be a non-industrial engine such as, for example, an automotive engine. The fuel container is in fluid communication with the engine to deliver a supply of fuel to the engine.

Figure 2:
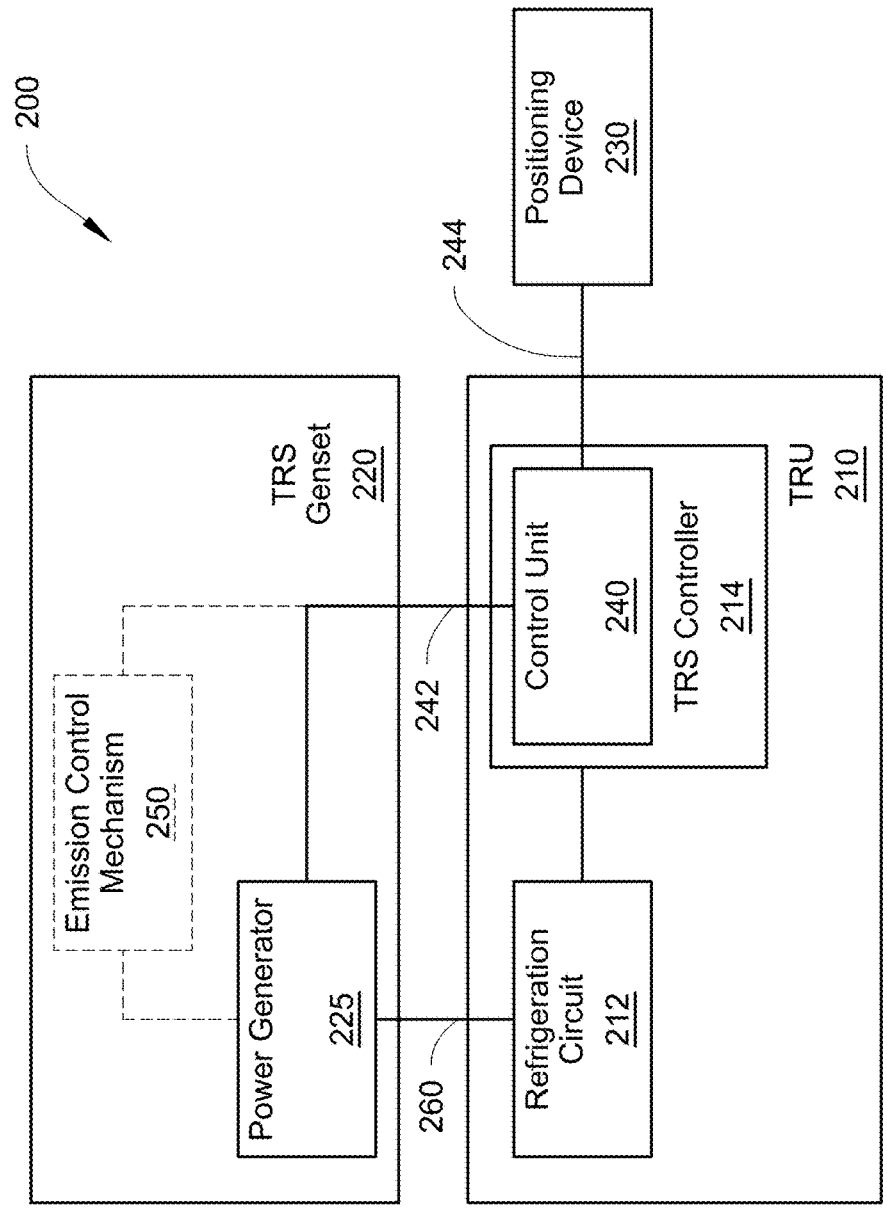
FIG. 2 illustrates a block diagram of a TRS, according to one embodiment.

FIG. 2 illustrates a block diagram of a TRS 200, according to one embodiment. Control parameters of the TRS 200 can be automatically adjusted according to local, regional and/or federal regulations on emissions, noise and/or other requirements applicable to a particular location and/or time. The control parameters can include, for example, revolutions per minute (RPM) of an engine of the TRS 200. The TRS 200 includes a TRU 210, a TRS genset 220, and a positioning device 230 separate from the TRU 210 and the TRS genset 220. It is to be understood that in other embodiments, the positioning device 230 can be located in the TRU 210 or the TRS genset 220. In some embodiments, the TRU 210 can be powered by an engine located inside the TRU 210.

It is to be understood that the TRU 210 can be powered in various modes. In some embodiments, the TRU 210 can be powered by a vehicle. In some embodiments, the TRU 210 can be electrically powered by, for example, a battery. In some embodiments, the TRU 210 can be shore powered. A TRS controller 214 of the TRS 200 can determine the availability of the various modes and toggle between the modes to provide power to the TRU 210.

The TRU 210 is configured to monitor and regulate various operating conditions (e.g., temperature, humidity, etc.) of an interior space of a transport unit connected to the TRU 210. The TRS genset 220 is configured to provide power to the TRU 210 via a power link 260 in order to maintain a desired temperature in an interior space of a TRS transport unit (not shown). That is, the TRS genset 220 is configured to provide power to the TRU 210 in order to, for example, allow the TRU 210 to regulate various operating conditions (e.g., temperature, humidity, etc.) of the interior space of the TRS transport unit.

The positioning device 230 is coupled to the TRU 210 and configured to provide real-time location and time information of the TRS 200. In some embodiments, the positioning device 230 can be configured to communicate with a satellite to receive global positioning system ("GPS") data regarding the location of the TRS genset 220 (and thus the location of the transport unit). In some embodiments, the positioned device 230 can be a device based on a GPS or a GRPS, a cellphone in communication with a telecommunication tower, etc. In some embodiments, the real-time location and time information of the TRS can be directly received by the control unit 240 via a communication network such as, for example, a wireless radio, a Wi-Fi network, a ZigBee network, etc. In some embodiments, the real-time location and time information can be determined based on information from components of a refrigerated transport unit where the TRS 200 is used, including, for example, an internal clock, an engine control unit ("ECU") of an engine, a measurement unit for determining tire revolutions, etc. Also, while this embodiment refers to real-time location and time information of the TRS, it is appreciated that in other embodiments, the location and time information of the TRS is not real-time information but information obtained, for example, within the past few seconds, the past minute, the past five minutes, the past hour, etc.

In some embodiments, when the real-time location and time information of the TRS 200 cannot be determined via, for example, the positioning device 230, the TRS controller 214 can set an alarm to alert a truck driver, or remotely to an operator or an owner at a headquarter of the goods being shipped or to a shipping company. In some embodiments, when the real-time location and time information of the TRS 200 cannot be determined, the TRS controller 214 can automatically set the TRS 200 in a fail-safe mode that can guarantee regulation compliance. In some embodiments, when the real-time location and time information of the TRS 200 cannot be determined, the TRS controller 214 can allow selection of a manual mode by, for example, an operator.

The TRU 210 includes a refrigeration circuit 212 and the TRS controller 214. The TRS controller 214 is configured to control the refrigeration circuit 212 to obtain various operating conditions (e.g., temperature, humidity, etc.) of an interior space of a transport unit and is powered by the TRS genset 220. The TRS controller 214 includes a control unit 240. The control unit 240 is configured to control the power generator 225 and other components of the TRS genset 220 via a link 242. The control unit 240 includes a communication link 244 that can communicate with the positioning device 230. The real-time location and time information of the TRS 200 (and thus the location of the transport unit) is transferred from the positioning device 230 to the control unit 240 via the communication link 244.

The refrigeration circuit 212 can include, for example, a condenser, a compressor coupled to the condenser, an evaporator and an Electronic Throttle Valve (ETV) that work together to cool the interior space of the transport unit based on instructions received from the TRS controller 214.

The TRS genset 220 includes a power generator 225. The power generator 225 is configured to generate power for powering components of the TRU 210 including, for example, the refrigeration circuit 212, the TRS controller 214, etc. The power generator 225 generally includes an engine (not shown), a fuel container (not shown) and a generator (not shown). The engine may be an internal combustion engine (e.g., diesel engine, etc.) that may generally have a cooling system (e.g., water or liquid coolant system), an oil lubrication system, an air filtration system (not shown), etc. The air filtration system filters air directed into a combustion chamber (not shown) of the engine. The fuel container is in fluid communication with the engine to deliver a supply of fuel to the engine. In some embodiments the engine is not specifically configured for the TRS, but can be a non-industrial engine such as, for example, an automotive engine.

Optionally, the TRS genset 220 includes an emission control mechanism 250 that can be configured to reduce emission from the power generator 225 without reducing the amount of power supply from the power generator 225. The emission control mechanism 250 can be automatically turned on by the control unit 240 when the control unit 240 determines that the TRS 200 is located within a predefined geographic region which requires reducing engine emission to be compliant with local, regional and/or federal regulations on emissions. The emission control mechanism 250 can include, for example, a diesel oxidation catalyst (DOC), a diesel particulate filter (DPF), an exhaust gas recirculation (EGR), a selective catalytic reduction (SCR), etc. It is to be understood that the emission control mechanism can be a unit that is separate from the TRS genset and is convenient for replacement or servicing.

Figure 3:
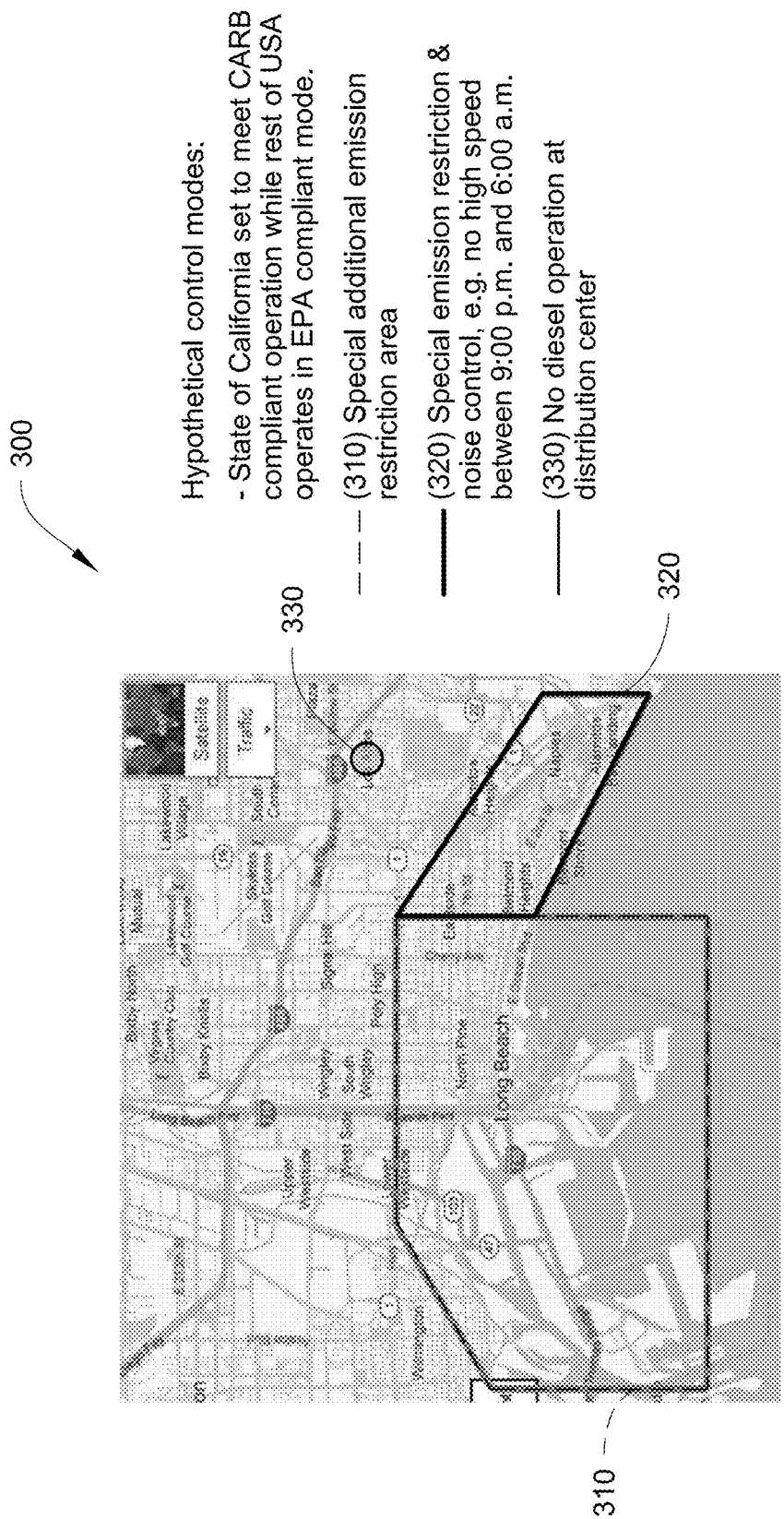
FIG. 3 illustrates a predefined geographic data 300 that corresponds to a portion of the State of California including predefined geographic regions, according to one embodiment.

In some embodiments, geographic data can be predefined according to, for example, local, regional and/or federal regulations on emissions, noise or other requirements applicable to a particular location and/or time. The geographic data can include, for example, one or more of geographic region data and time data. One embodiment of predefined geographic data is shown in FIG. 3 which will be described in detail further below. In some embodiments, the control unit 240 can include a memory to locally store the predefined geographic data. In some embodiments, the predefined geographic data can be remotely stored in an external server and can be input into the control unit 240 via, for example, the communication link 244.

In some embodiments, the control unit 240 can preset modes of operation of the TRS 200. Each of the operation modes can be, for example, a set of control parameters for the power generator 225. The operation modes can include, for example, high speed lockout, low speed lockout, maximum/minimum power limit, ultra-low emission compliant mode, low noise mode, etc.

In some embodiments, a database can be defined where predefined geographic data can be mapped to the preset modes of operation. That is, a specific predefined geographic region at a specific time range can be correlated to a specific operation mode. When the TRS 200 is located within the specific predefined geographic region and the local time is within the specific time range, the control unit 240 can run the power generator 225 with the correlated operation mode. In one embodiment, the database can be locally stored in the TRS 200. In another embodiment, the database can be remotely stored in an external server and can be called upon a request from the control unit 240.

In some embodiments, data of the preset operation modes can be sent from the control unit 240 to the refrigeration circuit 212 to control the operation of the refrigeration circuit 212.

The control unit 240 receives real-time location and time information from, for example, the positioning device 230, and determines appropriate geographic data by, e.g., comparing the real-time location and time information with the predefined geographic data. In this way, the control unit 240 determines how to adjust control parameters of the power generator 225 or a preset operation mode for the TRS 200.

According to the results of the comparison, the control unit 240 automatically adjusts control parameters of the power generator 225. When the TRS 200 is located in a predefined geographic region and at a specific local time, specific regulations can be invoked in that region. The control unit 240 can automatically adopt a preset operation mode to control emissions and/or noise from the power generator 225 to be compliant with the invoked regulations.

In some embodiments, the control unit 240 can control an engine horsepower of the power generator 225 under a preset maximum horsepower to meet clean emission standards without the use of the emission-control mechanism 250. In some embodiments, the control unit 240 can activate the emission-control mechanism 250 to reduce emissions without lowering an engine horsepower of the power generator 225. In some embodiments, the control unit 240 can stop operation of the power generator 225 at night for noise restrictions.

In some embodiments, the control unit 240 can record a log of operation information of the TRS 200, including, for example, location of the TRS 200, control parameters or operation mode of the power generator 225 and/or the refrigeration circuit 212, date and time, etc. The recorded log can be maintained for regulatory authority audits. In some embodiments, the recorded log can be stored in a memory of the control unit 240.

In some embodiments, the control unit 240 can receive alarm information such as, for example, a heavy-fog alarm, from an external information transceiver. The control unit 240 can preset operation modes for the TRS 200, each corresponding to one specific alarm information. When the control unit 240 receives specific alarm information, it can automatically adjust control parameters of the TRS 200 by using, for example, the correlated preset operation mode. The communication link 244 can communicate with the external information transceiver such as, for example, a smart phone connected to a telecommunication network, a radio transceiver communicating with a call tower, etc. The external information transceiver can receive alarm information, and transfer the alarm information to the control unit 240 via the communication link 244. In some embodiments, the communication link 244 can be a long range communication link that can be configured to communicate with an external server which can propagate the alarm information.

It is appreciated that in some embodiments, the TRS controller 214 can instruct the TRU 210 to operate in a predictive mode. Generally, the predictive mode can be configured to predict a future event for the TRU operation and modulate the current TRU operation to help the TRU 214 operate in the future event. For example, the TRU 210 can use technologies associated with, for example, geo-fencing and geo-tracking to obtain information that can help predict the TRU operation mode in a future time, and prepare the TRU 214 for the future operation mode.

The term geo-fencing generally means a virtual perimeter based on geographic information that can be, for example, set up ahead of the TRU operation. The term geo-tracking generally means tracking the geographic information of the TRU during the TRU operation. The geographic information can include, for example, geographic data that includes, for example, one or more of geographic region data and time data.

When, for example, the TRU 210 is about to enter a geo-fence that requires a particular operation mode (e.g. the noise reduction mode), the cooling capability of the TRU 210 may be limited inside the geo-fence. To help the TRU 210 to maintain a temperature, for example, the TRU 210 can be configured to cool down a little more before entering the geo-fence. This can help maintain the temperature of the TRU 210 when the TRU 210 is inside the geo-fence. The TRU 210 may also predict the future operation event based on other information. For example, the TRU 210 may receive a local temperature of the destination. When the local temperature is, for example, relatively high, the TRU 210 can cool the TRU 210 down more before reaching the destination. In some embodiments, using for example, the geo-fencing technologies, the TRU 210 can include the regulation compliance of multiple locations. The TRU controller 214 can, for example, switch the operation modes when the TRU 210 is in different geo-fence zones.

FIG. 3 illustrates a predefined geographic data 300 that corresponds to a portion of the State of California including predefined geographic regions 310, 320 and 330, according to one embodiment. The regions 310, 320 and 330 are predefined according to California Air Resource Board (CARB) regulations. The region 310 is predefined as an area having special additional emission restrictions. The region 320 is predefined as an area having special emission restrictions and noise control restrictions within a specific time range (e.g., engine cannot run at high speed between 9:00 pm and 6:00 am). The region 330 is predefined as a distribution center where the power generator 225 is required to stop operation.

When the control unit 240 determines that the TRS 200 is located in the State of California, for example, in a region corresponding to the predefined geographic data 300, specific CARB regulations can be invoked. In particular, when the control unit 240 receives real-time location and time information from the positioning device 230, compares it with the predefined geographic data 300, and determines that the TRS 200 is physically located in the region 310, the control unit 240 can map the determined geographic data (i.e., the region 310) to a preset operation mode of the power generator 225 and automatically adjust control parameters of the power generator 225. Thus, engine emission can be reduced to be compliant with the special additional emission restrictions in the region 310. Similarly, when the control unit 240 determines that the TRS 200 is physically located in the region 320 and the local time is between 9:00 pm and 6:00 am, the control unit 240 can automatically adjust control parameters of the power generator 225 to reduce engine emission and noise to be compliant with the special emission and noise restrictions in the region 310. When the control unit 240 determines that the TRS 200 is physically located in the region 330, the control unit 240 automatically stops engine operation. Similarly, when the control unit 240 determines that the TRS 200 is located in USA but outside the State of California, specific U.S. Environmental Protection Agency (EPA) regulations can be invoked.

Figure 4:
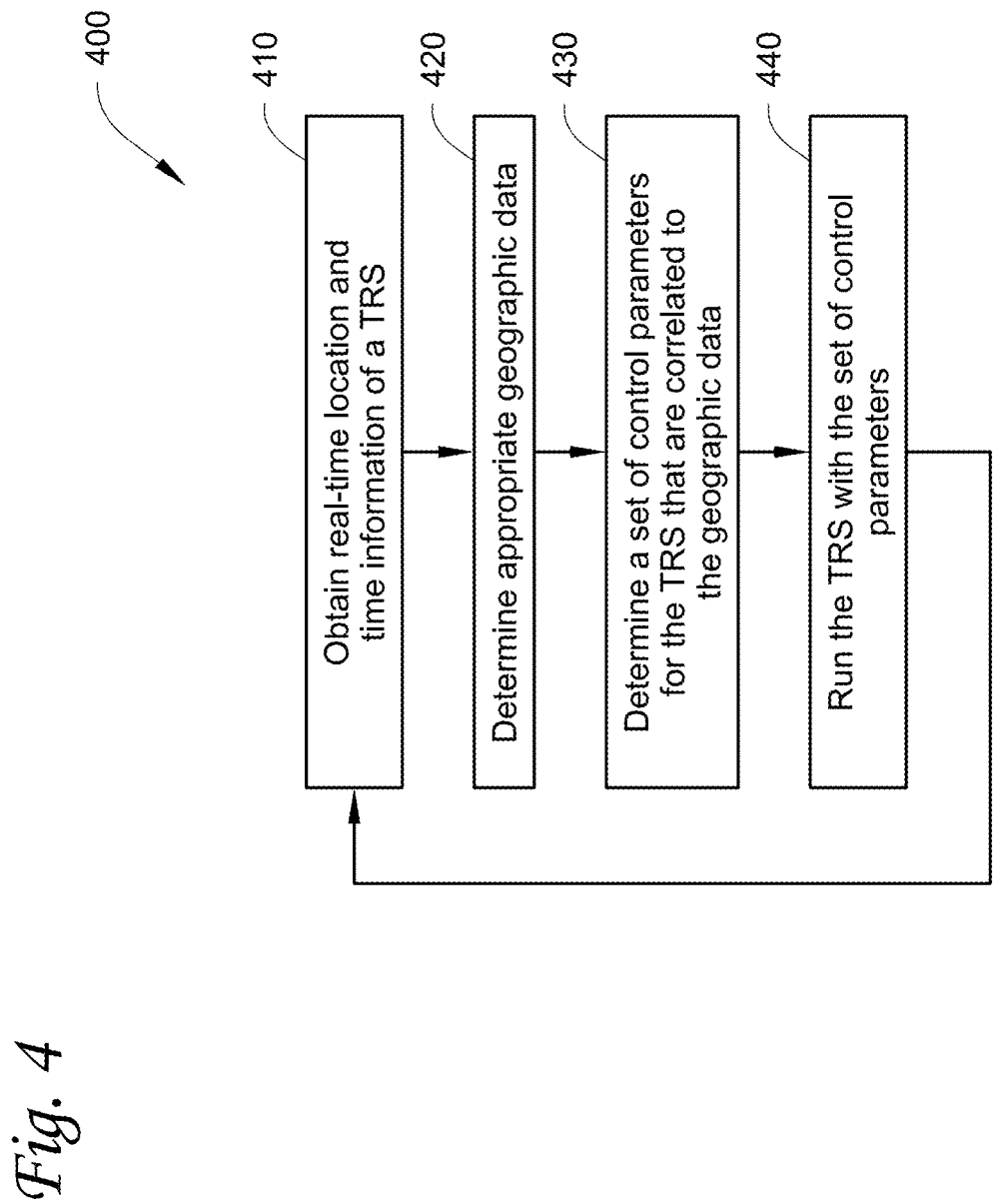
FIG. 4 illustrates a flow diagram of a method for the TRS in FIG. 2 to automatically adjust control parameters, according to one embodiment.

FIG. 4 illustrates a flow diagram of a method 400 for automatically adjusting control parameters of the TRS 200. The method 400 can automatically adjust control parameters of the TRS 200 according to local, regional and/or federal regulations on emissions, noise and/or other requirements applicable to a particular location and/or time.

At 410, the positioning device 230 obtains real-time location and time information of the TRS 200. The method 400 then proceeds to 420.

At 420, the control unit 240 of the TRS controller 214 determines appropriate geographic data. In some embodiments, the geographic data can include, for example, one or more of a specific geographic region where the TRS 200 is located, and an associated time range. In some embodiments, the control unit 240 can compare the real-time location and time information with each of the predefined geographic regions and time data to determine the appropriate geographic data (i.e., a specific geographic region where the TRS 200 is located and an associated time range). The method 400 then proceeds to 430.

At 430, the control unit 240 of the TRS controller 214 determines a set of control parameters for the TRS that are correlated to the geographic data determined at 420. In some embodiments, the control unit 240 can map the geographic data to a preset operation mode that includes the control parameters. The method 400 then proceeds to 440.

At 440, the TRS controller 214 runs the TRS 200 based on the set of control parameters determined at 430. The method 400 then proceeds to 410.

Aspects:

It is noted that any of aspects 1-9 below can be combined with any of aspects 10-16.

Aspect 1. A method for automatically adjusting control parameters of a transport refrigeration system (TRS), the method comprising:
  determining geographic data according to location and time information of the TRS;
  determining, via a control unit of the TRS, a set of control parameters correlated to the geographic data; and
  running, via the control unit, the TRS based on the set of control parameters.

Aspect 2. The method of aspect 1, wherein the geographic data includes one or more of geographic region data and time data.

Aspect 3. The method of any of aspects 1-2, wherein the location and time information of the TRS is obtained via a global positioning system (GPS).

Aspect 4. The method of any of aspects 1-3, further comprising running an emission-control mechanism based on the determined geographic data for reducing engine emission of the TRS.

Aspect 5. The method of any of aspects 1-4, wherein running the TRS includes running the TRS in a noise reduction mode.

Aspect 6. The method of any of aspects 1-5, further comprising pre-setting, via the control unit, one or more operation modes of the TRS, and each of the operation modes corresponds to the respective set of the control parameters.

Aspect 7. The method of aspect 6, wherein the operation modes are selected from a high-speed lockout mode, a low-speed lockout mode, a maximum/minimum power limit mode, an ultra-low emission compliant mode, and a noise reduction mode.

Aspect 8. The method of any of aspects 1-7, wherein running the TRS with the set of control parameters is independent of an operator's intervention.

Aspect 9. The method of any of aspects 1-7, further comprising logging data into a memory portion, the data including the geographic region, and the set of control parameters.

Aspect 10. A transport refrigeration system (TRS) comprising:
  a transport refrigeration unit (TRU) including a control unit;
  a TRS genset configured to provide power to the TRU; and
  a positioning device for sending location and time information to the control unit,
  wherein the control unit determines appropriate geographic data based on the real-time location and time information, and determines a set of control parameters correlated to the appropriate geographic data.
Aspect 11. The TRS of aspect 10, wherein the TRS genset includes a power generator.
Aspect 12. The TRS of any of aspects 10-11, wherein the geographic data includes one or more of geographic region data and time data.
Aspect 13. The TRS of any of aspects 10-12, where the positioning device includes one or more of a positioning device based on a global positioning system (GPS), a positioning device based on a general packet radio service (GPRS), and a cellphone in communication with a wireless network.
Aspect 14. The TRS of any of aspects 10-13, further comprising an emission-control mechanism for reducing engine emission of the TRS genset.
Aspect 15. The TRS of aspect 14, wherein the emission-control mechanism includes one or more of a diesel oxidation catalyst (DOC), a diesel particulate filter (DPF), an exhaust gas recirculation (EGR), and a selective catalytic reduction (SCR).
Aspect 16. The TRS of any of aspects 10-15, wherein the control unit pre-sets one or more operation modes of the TRS, and each of the operation modes corresponds to the respective set of the control parameters.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

The invention claimed is:

1. A method for automatically adjusting control parameters of a transport refrigeration system (TRS), the method comprising:
  determining geographic data according to a real-time location and time information of the TRS, wherein the geographic data includes geographic region data of where the TRS is currently located and time data indicating a current time of day where the TRS is currently located, the geographic region data being based upon predefined geographic region data including one or more noise or emission requirements for a particular region;
  determining, via a control unit of the TRS, a set of control parameters correlated to the geographic data;
  obtaining a preset operation mode for operation of a power generator of the TRS from a plurality of preset operation modes based on the set of control parameters correlated to both the current location and the current time, the plurality of preset operation modes including:
    an ultra-low emission compliant mode that reduces emissions of the power generator of the TRS without lowering a horsepower of the power generator, and
    a low noise mode that includes stopping operation of the power generator of the TRS; and
  running, via the control unit, the power generator of the TRS in the preset operation mode when the TRS is in the particular region.

2. The method of claim 1, wherein the real-time location and time information of the TRS is obtained via a global positioning system (GPS).

3. The method of claim 1, further comprising pre-setting, via the control unit, one or more of the plurality of preset operation modes, and each of the plurality of preset operation modes corresponds to a respective set of the control parameters.

4. The method of claim 1, wherein the ultra-low emission compliant mode includes activating an emission-control mechanism to reduce the emissions of the power generator of the TRS without lowering the horsepower of the power generator.

5. The method of claim 1, wherein running the TRS with the set of control parameters is independent of an operator's intervention.

6. The method of claim 1, wherein the control unit operates the TRS in a predictive mode whereby the control unit prepares the TRS to enter a geo-fence by obtaining the preset operation mode for the geo-fence, and prepares the TRS for the geo-fence by adjusting the operating condition of the interior space prior to the TRS entering the geo-fence to maintain a desired operating condition of the interior space while the TRS is within the geo-fence, the geo-fence corresponding to the particular region having the one or more noise or emission requirements.

7. The method of claim 6, wherein when the control unit predicts that the TRS is going to enter a geo-fence that requires the TRS to operate in the low noise mode, the control unit increases cooling with the interior space prior to the TRS entering the geo-fence.

8. The method of claim 6, wherein when the control unit predicts that the TRS is going to enter a geo-fence that is currently at a relatively high temperature, the control unit increases cooling with the interior space prior to the TRS entering the geo-fence.

9. The method of claim 1, further comprising the control unit receiving alarm information from an external transceiver that is external to the TRS, the alarm information being an alarm of a weather condition, and the control unit automatically adjusting the preset operation mode based on the obtained alarm information to adjust the operating condition of the interior space.

10. The method of claim 9, further comprising the control unit sending an alert when the geographic data cannot be determined.

11. The method of claim 1, wherein the plurality of preset operation modes further includes:
  a lockout operation mode, and
  a maximum/minimum power limit mode.

12. A transport refrigeration system (TRS) comprising:
  a transport refrigeration unit (TRU) including a control unit;
  a TRS genset including a power generator; and
  a positioning device for sending real-time location and time information to the control unit,
  wherein the control unit determines appropriate geographic data based on the real-time location and time information, wherein the geographic data includes geographic region data of where the TRS is currently located and time data indicating a current time of day where the TRS is currently located, and the geographic region data being based upon predefined geographic region data including one or more noise or emission requirements for a particular region, wherein the control unit determines a set of control parameters correlated to the appropriate geographic data, wherein the control unit obtains a preset operation mode for operation of the power generator from a plurality of preset operation modes based on the set of control parameters correlated to both the current location and the current time, the plurality of preset operation modes including:
- an ultra-low emission compliant mode that reduces emissions of the power generator of the TRS without lowering a horsepower of the power generator, and
- a low noise mode that includes stopping operation of the power generator of the TRS; and wherein the control unit runs the power generator in the preset operation mode when the TRS is in the particular region.

13. The TRS of claim 12, further comprising an emission-control mechanism for reducing the emissions of the power generator of the TRS, wherein the ultra-low emission compliant mode includes activating the emission-control mechanism to reduce the emissions of the power generator of the TRS without lowering the horsepower of the power generator.

14. The TRS of claim 13, wherein the emission-control mechanism includes a diesel oxidation catalyst (DOC), and a diesel particulate filter (DPF).

15. The TRS of claim 12, wherein the control unit operates the TRS in a predictive mode whereby the control unit prepares the TRS to enter a geo-fence by obtaining the preset operation mode for the geo-fence, and prepares the TRS for the geo-fence by adjusting the operating condition of the interior space prior to the TRS entering the geo-fence to maintain a desired operating condition of the interior space while the TRS is within the geo-fence, the geo-fence corresponding to the particular region having the one or more noise or emission requirements.

16. The TRS of claim 15, wherein when the control unit predicts that the TRS is going to enter a geo-fence that requires the TRS to operate in the low noise mode, the control unit increases cooling with the interior space prior to the TRS entering the geo-fence.

17. The TRS of claim 15, wherein when the control unit predicts that the TRS is going to enter a geo-fence that is currently at a relatively high temperature, the control unit increases cooling with the interior space prior to the TRS entering the geo-fence.

18. The TRS of claim 12, wherein the control unit receives alarm information from an external transceiver that is external to the TRS, the alarm information being an alarm of a weather condition, and the control unit automatically adjusts the preset operation mode based on the obtained alarm information to adjust the operating condition of the interior space.

19. The TRS of claim 12, wherein the control unit sends an alert when the geographic data cannot be determined.

20. The TRS of claim 12, wherein the plurality of preset operation modes further includes:
- a lockout operation mode, and
- a maximum/minimum power limit mode.

* * * * *